United States Patent [19]

Searfoss et al.

[11] Patent Number: 5,245,842
[45] Date of Patent: Sep. 21, 1993

[54] RECEIVER DRYER

[75] Inventors: Jerry R. Searfoss, Troy; Ronald J. Sievert, Washington, both of Mich.

[73] Assignee: Fayette Tubular Technology Corporation, Wilmington, Del.

[21] Appl. No.: 877,832

[22] Filed: May 1, 1992

[51] Int. Cl.$^5$ .............................................. F25B 43/00
[52] U.S. Cl. ...................................... 62/474; 210/282; 210/510.1; 210/DIG. 6
[58] Field of Search ........................... 62/474, 475, 85; 210/282, 484, 510.1, DIG. 6, DIG. 7

[56] References Cited

U.S. PATENT DOCUMENTS

| 1,743,877 | 1/1930 | Broido | 29/455.1 |
|---|---|---|---|
| 2,392,886 | 1/1946 | Stecher et al. | 113/112 |
| 2,659,128 | 11/1953 | Baldwin, Jr. et al. | 29/148.2 |
| 2,968,405 | 1/1961 | Veres | 210/510.1 X |
| 3,463,320 | 8/1969 | Patterson | 210/282 X |
| 3,535,235 | 10/1970 | Schouw | 210/282 X |
| 3,754,409 | 8/1973 | Wreen, Jr. et al. | 62/503 |
| 4,045,861 | 9/1977 | Zahid | 29/454 |
| 4,255,940 | 3/1981 | Grahl et al. | 62/324.3 |
| 4,288,894 | 9/1981 | Jacobellis | 29/157 R |
| 4,331,001 | 5/1982 | Jones | 62/503 |
| 4,381,998 | 5/1983 | Roberts et al. | 210/510.1 X |
| 4,509,340 | 4/1985 | Mullally et al. | 62/503 |
| 4,637,881 | 1/1987 | Sciuto | 62/474 X |
| 4,649,719 | 3/1987 | Yanagisawa | 62/474 |
| 4,675,971 | 6/1987 | Masserang | 29/422 |
| 4,768,355 | 9/1988 | Breuhan et al. | 62/503 |
| 4,838,040 | 6/1989 | Freeman | 62/475 |
| 4,908,132 | 3/1990 | Koval et al. | 210/446 |
| 4,920,766 | 5/1990 | Yamamoto | 62/474 |
| 4,939,904 | 7/1990 | Carlisle, Jr. | 62/77 |
| 4,994,185 | 2/1991 | Cullen et al. | 210/282 |
| 5,036,972 | 8/1991 | Cullen et al. | 206/204 |
| 5,038,582 | 8/1991 | Takamatsu | 62/474 |
| 5,048,309 | 9/1991 | Carlisle, Jr. | 62/503 |
| 5,061,367 | 10/1991 | Hatch et al. | 210/282 X |

Primary Examiner—William E. Tapolcai
Attorney, Agent, or Firm—Remy J. VanOphem

[57] ABSTRACT

A receiver dryer for an automobile air conditioning system embodies a cylindrical housing having a spin-closed top end; an inlet tube and an outlet tube inserted in holes drilled in the top end of the housing and both extending through the housing to their respective predetermined positions; and an axially inserted desiccant bag and thermoplastic perforate filter. The outlet tube extends through a hole in the filter to a predetermined position from the bottom end of the housing, and a retainer clip holds the filter at a set position in the housing while the bottom end of the housing is spin-closed. Spin closing the bottom end creates a thermal gradient in the wall of the housing such that the thermoplastic perforate filter is thermally bonded at its edge to irregularities of the inner surface of the housing thereby forming a barrier to any particulates which might otherwise have passed by the filter.

14 Claims, 3 Drawing Sheets

RECEIVER DRYER

BACKGROUND OF THE INVENTION

1. Field of the Invention

The present invention relates to receiver dryer devices, particularly for vehicular air-conditioning systems, for separating moisture-laden, partially vaporized refrigerant fluid into a moisture-free refrigerant vapor having a predetermined, specific lubricating oil content.

2. Description of the Prior Art

In most any refrigeration system, and certainly any vehicular air-conditioning system, the use of a receiver dryer at the outlet end of the condenser is an alternative to the use of an accumulator at the outlet end of the evaporator. The receiver dryer receives refrigerant fluid, typically freon-12, at a high pressure (e.g. 200 psig) and high temperature (e.g. 150° F.) and filters any particulates in the fluid and removes any moisture or water which may be present in the refrigerant fluid. At the outlet end of the receiver dryer, the refrigerant fluid is passed through an expansion device or valve and thereby transformed to a vapor of low temperature (e.g. 50° F.) and pressure (e.g. 40 psig), prior to it being passed through the evaporator. Typical examples of such a system are shown in U.S. Pat. Nos. 4,649,719; 5,038,582 and 4,908,132.

Closely related apparatuses are accumulators located downstream of the evaporator and used as an alternative to a receiver dryer, each serving the common purposes of filtering particulates and removing water from the refrigerant and each also acting as a storage reservoir for the refrigerant fluid when the system is disengaged. One example of a highly efficient, fairly economically manufactured receiver dryer is shown in U.S. Pat. No. 4,675,971 assigned to the assignee of the present invention, wherein a cylindrical, aluminum housing is completely closed at its bottom end by a spinning operation, is loaded with a desiccant material and perforate disc-shaped member, and then capped with a top containing inlet and outlet tubular members.

The present invention maintains the functional efficiency of such known devices, but includes fewer components and a simplified and more reliable method of manufacture.

SUMMARY OF THE INVENTION

The present invention contemplates a receiver dryer member for a refrigeration system, particularly a vehicular air-conditioning system, of the simplest construction and containing a minimum number of components, yet being the full, functional equivalent of known receiver dryer devices.

The invention further contemplates a receiver dryer member as described above, having enhanced reliability resulting from its simplistic structure and method of manufacture.

The invention further contemplates a receiver dryer constructed in such manner that the final manufacturing step of spin closing the bottom open end of the receiver dryer housing generates sufficient heat to thermally form the thermoplastic perforate particulate filtering element to the housing and thereby also provide an ideal seal between the filter element and dryer housing where desired.

The invention further contemplates a receiver dryer structure and method of manufacture whereby the use of a desiccant material containing cartridge, which may optionally include in combination a particulate filter element, is facilitated.

DETAILED DESCRIPTION OF THE PREFERRED EMBODIMENT

Figure 1:
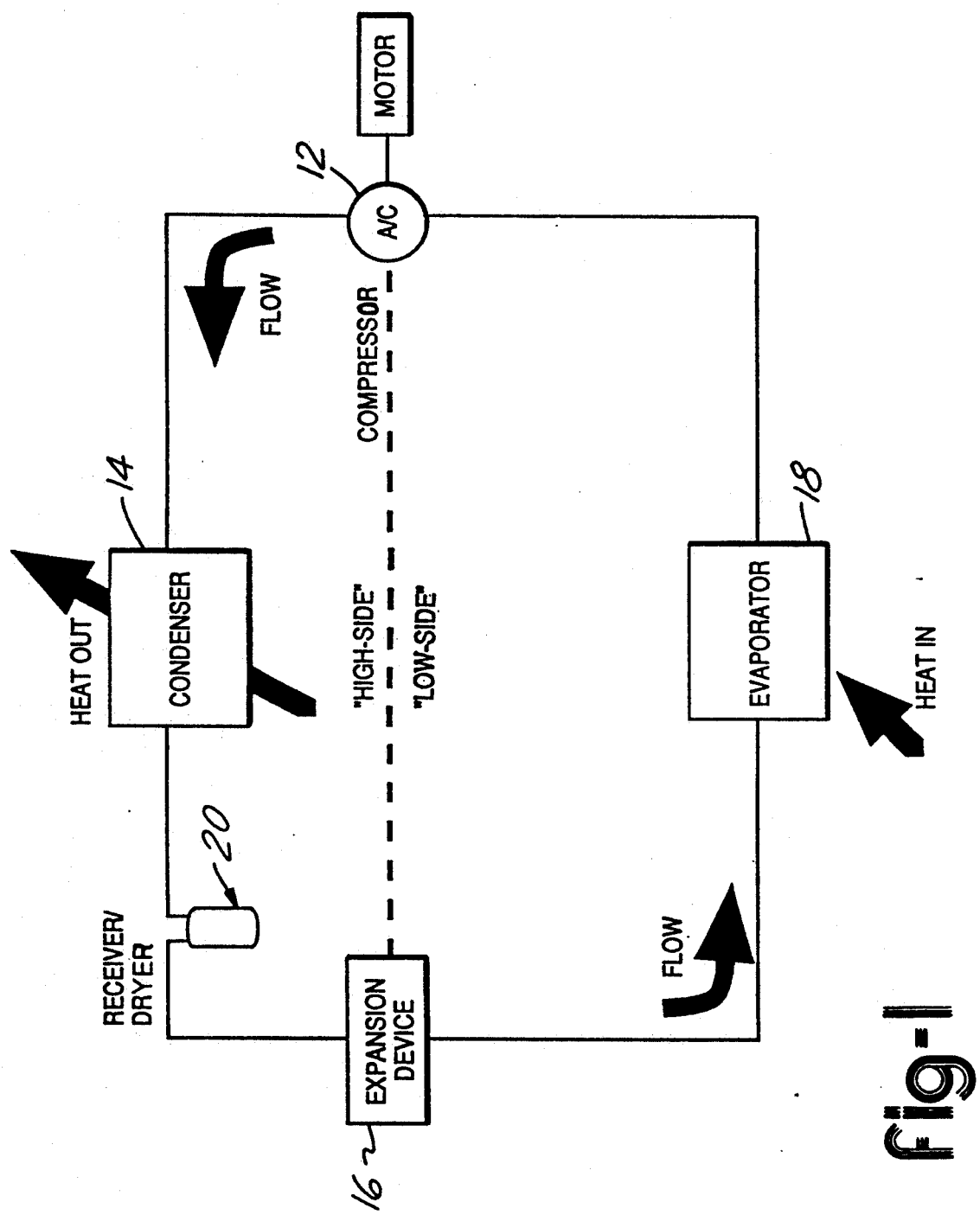
FIG. 1 is a schematic representation of a typical vehicular air-conditioning system incorporating use of a receiver dryer as may be designed pursuant to the present invention.

Referring to FIG. 1, there is a schematic of a generally conventional vehicular air-conditioning system including a compressor 12, condenser 14, expansion device 16, evaporator 18 and a receiver dryer generally designated 20. A refrigerant fluid, such as freon-12 or the like, is circulated through the system beginning as a high temperature/high pressure vapor on the outboard side of the compressor 12, then passing through the condenser 14, during which time additional heat is taken out of the vapor forming a high temperature/high pressure liquid, then passing through a receiver dryer constructed in accordance with the present invention, then passing through the expansion device or orifice tube 16 such as that which is commonly termed an "H" valve causing thermal expansion of the refrigerant and thereby producing a low temperature/low pressure vapor/liquid stream passing through the evaporator 18 which takes in heat from the heated vehicular passenger compartment and transforming the refrigerant to a low temperature/low pressure vapor.

As shown in FIGS. 1 through 4, the receiver dryer 20 of the present invention includes a cylindrical tubular housing 22 which is spun closed at both ends as indicated by dimples 24 located on the longitudinal axis 26 of the housing member and formed as a result of the spinning operation. Preferably, an aluminum alloy such as 6063 T6 or its equivalent is used, which is readily adaptable to the manufacturing techniques discussed in detail below and provides a lightweight component which is of great demand in the automotive industry. An inlet tube 28 and an outlet tube 30 extend through the top end wall 32 of the receiver dryer to different points within a chamber 34 defined by the housing enclosure. Both the inlet and outlet tube are disposed parallel to the longitudinal axis 26 of the housing and the longitudinal of each is located on a common centerline 36. The outlet tube 30 extends to the bottom or opposite end 38 of the housing and includes a discharge end 40 located at a predetermined distance from the bottom of the housing. The inlet tube 28 includes a discharge end 42 which is located near the uppermost regions of the chamber 34. Within the chamber 34 of the receiver dryer housing is located a desiccant material containing member 50. Conventionally, such a member would include a flexible perforate cloth bag 52 filled with granules 54 of silica gel or calcium chloride. The desiccant material containing member is supported within the chamber 34 by a perforate thermoplastic filter element 60 made of sintered polypropylene pellets 62 or equivalent material such as high-density polyethylene, ultra high molecular weight polyethylene, polypropylene, polyvinylidene fluoride, ethylene-vinyl acetate, polytetrafluoroethylene, stryene-acrylonitrile, or nylon.

Figure 4:
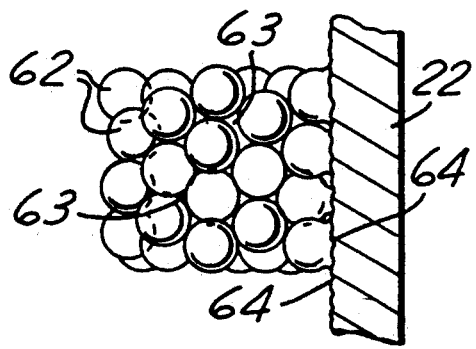
FIG. 4 is an enlarged cross-sectional view of the encircled area designated 4 in FIG. 2.

As seen in FIG. 4, the interstices 63 between the sintered pellets 62 form a tortuous flow path for refrigerant fluid and provide an effective filter for catching any particulates. Generally, the filter element 60 may be produced with an effective sieve size ranging from about 10 microns to about 100 microns. For most automotive air conditioning systems, a design specification of about 15 microns is preferred, i.e. particulates 15 microns and larger are precluded from passing through the filter.

Figure 2:
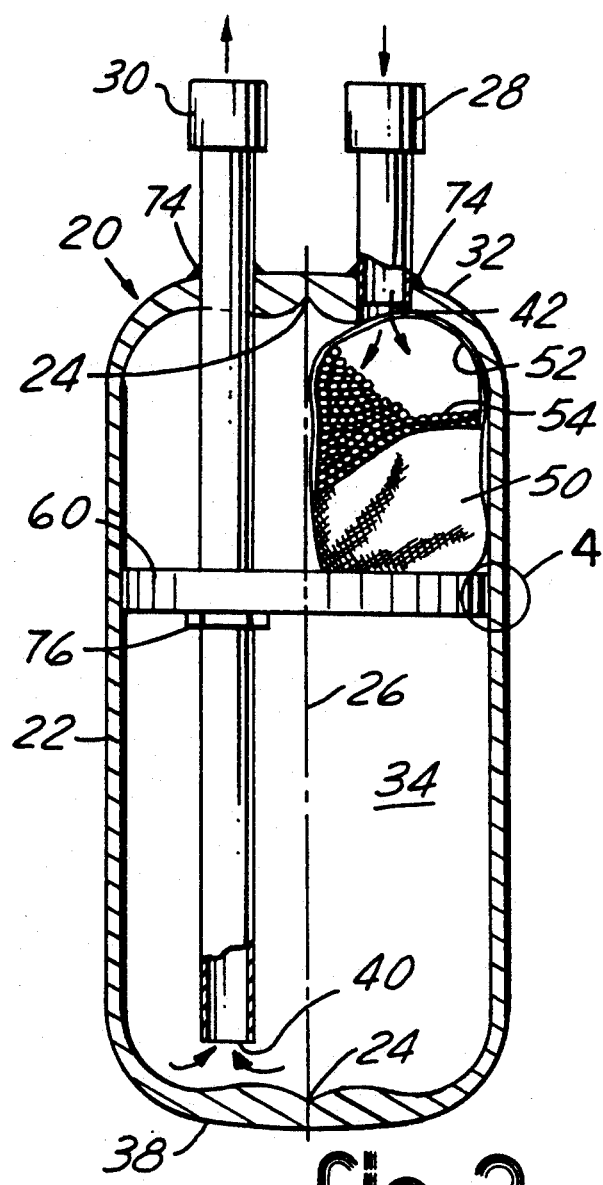
FIG. 2 is an elevational view of the present invention shown partially in cross-section taken along section lines 2—2 of FIG. 3.
Figure 3:
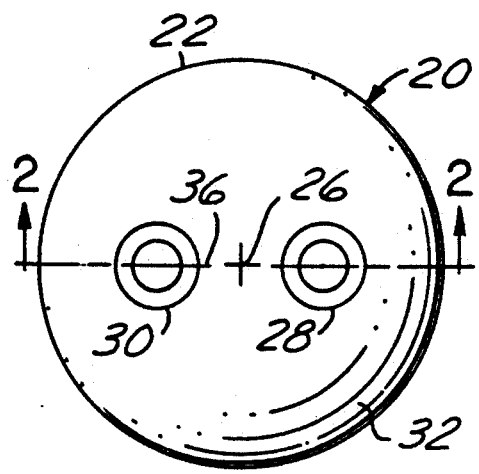
FIG. 3 is a plan view of the present invention.
Figure 5:
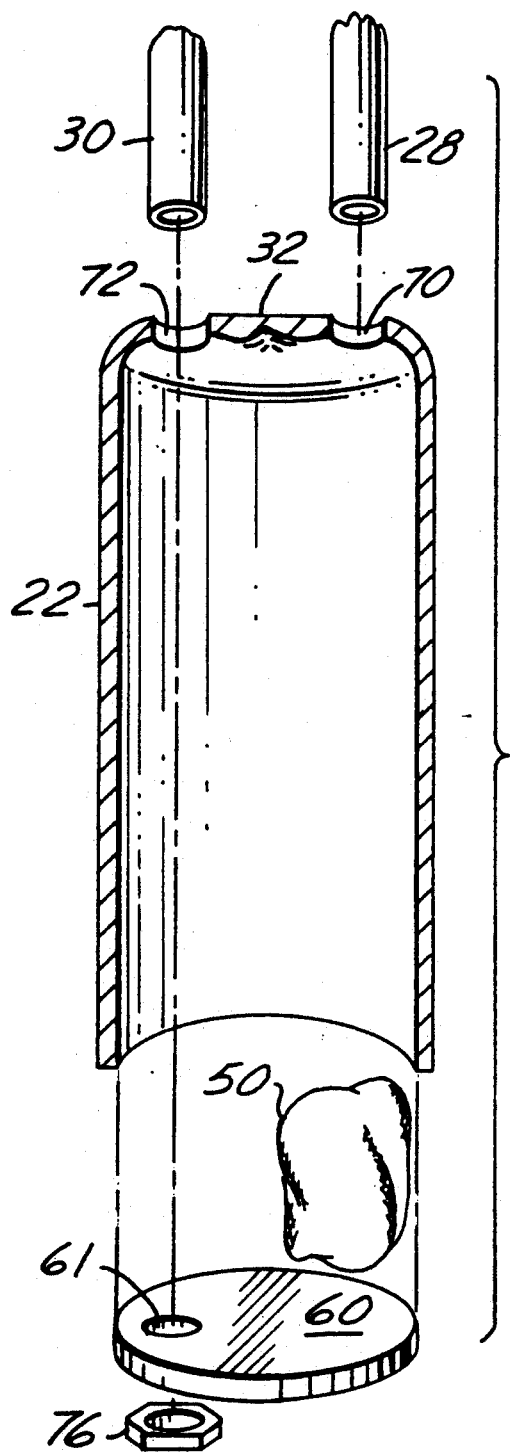
FIG. 5 is an exploded view of the receiver dryer as shown in FIGS. 2 and 3.

As seen best in FIGS. 2 and 5, the inlet and outlet tubes 28 and 30 extend through the respective inlet and outlet ports 70 and 72 and upon being positioned for their respective lengths are brazed to the housing as indicated at 74.

The filter element 60 may temporarily be maintained in place on the outlet tube by means of a one-way slip fit-type lock washer 76 as shown in FIGS. 2 and 5. However, as explained in detail below, the permanent position of the filter element 60 relative to the housing is maintained by means of thermally forming the filter element to the internal wall of the housing. The necessary heat to partially melt or soften the filter at the interface in contact with the internal housing wall is generated during the final assembly step of spin closing the bottom end 38 of the housing. This spin closing step generates conductive heat in the housing wall in the area of the filter element in the order of 300° F. to about 400° F., whereas the temperature at the bottom end 38 may be about 1100° F.

It will be noted from the enlarged view of FIG. 4 that the housing internal wall includes numerous surface irregularities 64. These are normal irregularities produced during forming, as by extruding, the cylindrical housing. As the housing is spun to close off the bottom end 38, the outer rim portion of the filter element 60, softened by the conductive heat of the spin closing step, is caused to centrifugally flow into these surface irregularities 64, completely filling them and thereby fixing the position of the filter element 60 to the housing by this thermal forming operation and providing a complete and ideal seal at the thermally formed interface of the filter and housing.

Figure 6:
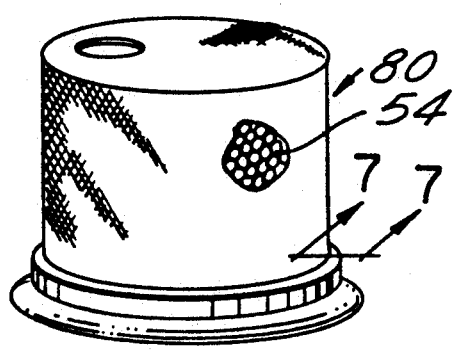
FIG. 6 is a perspective view shown partially in section of a desiccant material containing and particulate filter combination cartridge unit of known construction suitable for use with the present invention.
Figure 7:
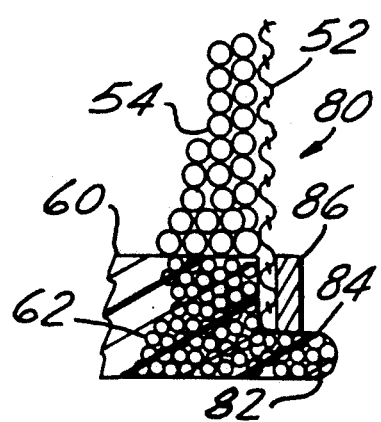
FIG. 7 is a partial cross-sectional view taken along section lines 7—7 of FIG. 6.

As shown in FIG. 5, the dual component combination of the desiccant material containing member or bag 50 and the thermoplastic particulate filter element 60 can be replaced by a combination cartridge unit 80 such as shown in FIG. 6.

The cartridge unit 80 includes the annular disc-like filter 60 previously described and an annular bead or rim portion 82. The rim portion 82 defines a shoulder 84 with the upper end of the filter over which a retainer ring 86 may be press-fitted to retain therebetween a portion of the perforate filter bag 52 thereby retaining the desiccant granules 54. Alternatively, the construction of the cartridge 80 may be conventional and represent no part of the present invention except to the extent that it includes an outer plastic rim portion selected of a material such as polypropylene or other similar material described above, so that the seal and thermally formed bond at the annular rim portion 82 of the cartridge unit will be established during the spin closing of the bottom end 38 of the housing.

Figure 8:
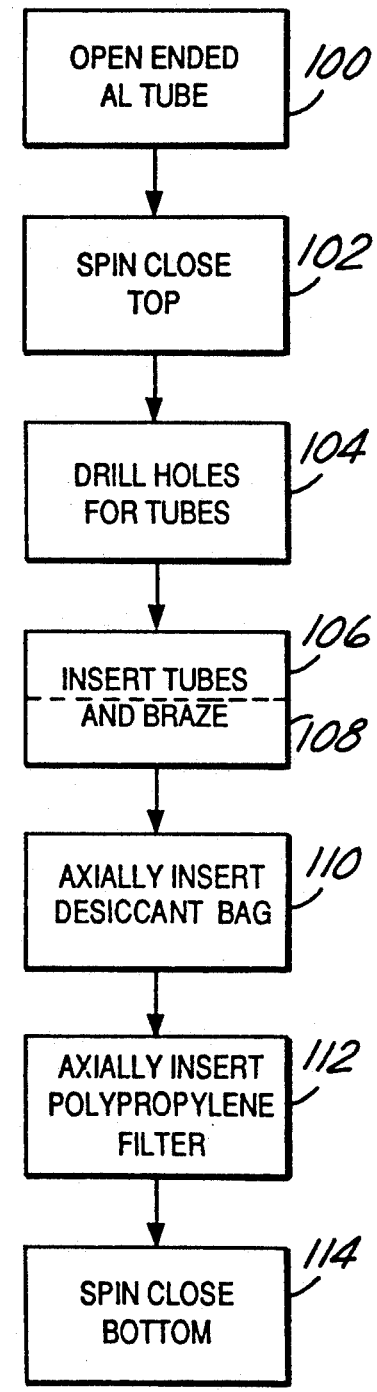
FIG. 8 is a schematic block diagram of the method of manufacture of the receiver dryer in accordance with the present invention.

As shown schematically in FIG. 8 the process or method of manufacture of the receiver dryer in accordance with the present invention includes the following steps:

100. selecting an open-ended aluminum cylindrical tube of 6063 T6 aluminum material or equivalent;

102. spin closing one end of the housing, the spin closing technique being conventional in the art as taught in U.S. Pat. No. 4,675,971, for example the disclosure of which is hereby incorporated by reference;

104. drilling inlet and outlet ports 70 and 72 in the spin-closed end of the housing to the same size of the outer diameter of the inlet and outlet tubes 28 and 30, respectively;

106. inserting inlet and outlet tubes through their respective inlet and outlet ports, and fixing them at the relative length established for the discharge end of each;

108. brazing each tube at 74 to the top end wall 32 of the housing;

110. axially inserting a desiccant material containing member 50 to a point in proximity with the discharge end of the inlet tube 28;

112. axially inserting an annular polypropylene, or similar, perforate filter element 60 within the chamber until the point approximately midway of the longitudinal axis of the chamber 34 defined by the housing, with the filter element including a slot or hole 61 allowing it to slide upon one length of the outlet tube and optionally temporarily secured thereto by means of a mechanical fastener, such as a push-on type, one-way locking washer member 76;

114. finally, spin closing the remaining open end of the housing and generating sufficient heat within the housing as a result of the spinning operation, on the order of 300° F. to about 400° F. at the filter element 60, to thermally and centrifugally form and thereby bond and seal the annular outer rim 82 of the filter element 60 to the internal wall surface of the housing 22 using the spin closing technique as applied to closing the other end of the housing (step b.)

Although particular embodiments of the present invention have been illustrated in the accompanying drawings and described in the foregoing detailed description, it is to be understood that the present invention is not to be limited to just the embodiments disclosed. Numerous rearrangements, modifications and substitutions are possible, without departing from the scope of the claims hereafter.

What is claimed is:

1. A receiver dryer for use in an air conditioning system to dehydrate a refrigerant fluid and filter therefrom particulates potentially harmful to said system, comprising:

a fully enclosed elongate housing having a longitudinal axis and having an interior surface defining an enclosed chamber;

an inlet tube extending through said housing and having a discharge end at one end of said housing;

an outlet tube extending through said housing and having an inlet end at the other end of said housing opposite said inlet tube discharge end; and a thermoplastic perforate filter element extending in a plane at an angle to said longitudinal axis; and means for thermally bonding said filter element to said interior surface of said housing, such that said filter element is permanently bonded to said housing intermediate said inlet tube discharge end and said outlet tube inlet end whereby said refrigerant fluid being circulated through said receiver dryer is forced to flow through said filter element, thereby removing any particulates which might otherwise be harmful to said air conditioning system.

2. The invention as set forth in claim 1 wherein said housing is an elongate cylindrical tube closed at each end by centrifugal spinning.

3. The invention as set forth in claim 2 wherein said housing is an aluminum alloy.

4. The invention as set forth in claim 1 wherein said filter element is an annular flat plate of sintered thermoplastic pellets, the interstices between said pellets forming a tortuous flow path for said refrigerant fluid.

5. The invention as set forth in claim 2 wherein said filter element is thermally conformed to the surface irregularities of said interior surface of said housing around the entire circumference of said filter element under action of the centrifugal force and conductive heat generated during spin closing one of said housing ends.

6. A receiver dryer for use in an air conditioning system to dehydrate a refrigerant fluid and filter therefrom particulates potentially harmful to said system, comprising:

a fully enclosed elongate housing having a longitudinal axis and having an interior surface defining an enclosed chamber;

an inlet tube extending through said housing and having a discharge end at one end of said housing;

an outlet tube extending through said housing and having an inlet end at the other end of said housing opposite said inlet tube discharge end;

a thermoplastic perforate filter element extending in a plane at an angle to said longitudinal axis; and means for thermally conforming said filter element to said interior surface of said housing, such that said filter element is permanently mounted to said housing intermediate said inlet tube discharge end and said outlet tube inlet end whereby said refrigerant fluid being circulated through said receiver dryer is forced to flow through said filter element, thereby removing any particulates which might otherwise be harmful to said air conditioning system;

said housing being an elongate cylindrical tube of aluminum alloy closed at each end by centrifugal spinning; and a desiccant material containing dehydrating means for withdrawing moisture from said refrigerant fluid being located within said chamber intermediate said filter element and said one end of said housing receiving said discharge end of said inlet tube.

7. The invention as set forth in claim 6 wherein said dehydrating means is a desiccant material contained within a flexible bag element.

8. The invention as set forth in claim 6 wherein said dehydrating means and said filter element are a single cartridge unit.

9. The invention as set forth in claim 8 wherein said cartridge unit is generally cylindrical and has an axis coinciding with said axis of said housing, said filter element defining an end wall upon which is supported said dehydrating means, said filter element including an annular main body portion and an annular rim portion extending radially therefrom.

10. The invention as set forth in claim 9 wherein said filter element is thermally conformed to said internal surface of said housing at the radially outermost extremities of said annular rim portion.

11. The invention as set forth in claim 10 wherein a shoulder is provided at the junction of said main body portion and said rim portion; said dehydrating means including a desiccant material contained within a flexible perforate bag, the open end of said bag surrounding said main body portion and being fixed to said filter element at said shoulder.

12. The invention as set forth in claim 11 wherein said cartridge unit includes an annular retainer ring press-fitted around said main body portion with said flexible perforate bag being retained therebetween.

13. A receiver dryer for use in an air conditioning system to dehydrate a refrigerant fluid and filter therefrom particulates potentially harmful to said system, comprising:

a fully enclosed elongate housing having a longitudinal axis and having an interior surface defining an enclosed chamber;

an inlet tube extending through said housing and having a discharge end at one end of said housing;

an outlet tube extending through said housing and having an inlet end at the other end of said housing opposite said discharge end of said inlet tube;

a thermoplastic perforate filter element extending in a plane at an angle to said longitudinal axis; means for thermally conforming said filter element to said interior surface of said housing, such that said filter element is permanently mounted to said housing intermediate said inlet tube discharge end and said outlet tube inlet end, whereby said refrigerant fluid being circulated through said receiver dryer is forced to flow through said filter element, thereby removing any particulates which might otherwise be harmful to said air conditioning system;

said housing further comprising an elongate cylindrical aluminum alloy tube closed at each end by centrifugal spinning;

said filter element further having an annular flat plate of sintered thermoplastic pellets, the interstices between said pellets forming a tortuous flow path for said refrigerant fluid and being an equivalent sieve size capable of excluding particulates ranging in size from about 10 microns to about 100 microns;

said means for thermally conforming said filter element thermally conforming said thermoplastic pellets to the surface irregularities of said interior surface of said housing around the entire circumference of said filter element under action of the centrifugal force and conductive heat generated during spin closing one of said housing ends; and a desiccant material containing dehydrating means for withdrawing moisture from said refrigerant fluid being located within said chamber intermediate said filter element and said one end of said housing receiving said discharge end of said inlet tube.

14. The invention as set forth in claim 13 wherein said dehydrating means and said filter element are a single cartridge unit having an annular edge thermally conforming to said interior surface of said housing.

* * * * *

UNITED STATES PATENT AND TRADEMARK OFFICE
CERTIFICATE OF CORRECTION

PATENT NO. : 5,245,842
DATED : September 21, 1993
INVENTOR(S) : Jerry Searfoss, Ronald J. Seivert It is certified that error appears in the above-indentified patent and that said Letters Patent is hereby corrected as shown below:

```
Column 2, line 40, delete "a" insert ---- the ----.

Column 2, line 65, after "longitudinal" insert ---- axis ----.

Column 3, line 27, delete ---- the ----.
```

Signed and Sealed this

Twenty-seventh Day of June, 1995

Attest:

BRUCE LEHMAN

Attesting Officer          Commissioner of Patents and Trademarks